United States Patent
Shiraishi et al.

(10) Patent No.: US 12,488,589 B2
(45) Date of Patent: Dec. 2, 2025

(54) VIDEO PROCESSING DEVICE, VIDEO PROCESSING METHOD, TRAINING DEVICE, TRAINING METHOD, AND RECORDING MEDIUM

(71) Applicant: NEC Corporation, Tokyo (JP)

(72) Inventors: Soma Shiraishi, Tokyo (JP); Katsumi Kikuchi, Tokyo (JP); Yu Nabeto, Tokyo (JP); Haruna Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 373 days.

(21) Appl. No.: 17/926,679

(22) PCT Filed: May 27, 2020

(86) PCT No.: PCT/JP2020/020867
§ 371 (c)(1),
(2) Date: Nov. 21, 2022

(87) PCT Pub. No.: WO2021/240677
PCT Pub. Date: Dec. 2, 2021

(65) Prior Publication Data
US 2023/0196775 A1     Jun. 22, 2023

(51) Int. Cl.
*G06K 9/00* (2022.01)
*G06V 10/774* (2022.01)
*G06V 20/40* (2022.01)

(52) U.S. Cl.
CPC ............ *G06V 20/47* (2022.01); *G06V 10/774* (2022.01); *G06V 20/41* (2022.01)

(58) Field of Classification Search
CPC ...... G06V 20/47; G06V 20/41; G06V 10/774; G06V 20/35; G06V 20/36; G06V 20/38;
(Continued)

(56) References Cited

U.S. PATENT DOCUMENTS 11,748,988 B1 * 9/2023 Chen ..................... G06F 16/78
                                                   386/241
12,169,960 B2 * 12/2024 Nabeto .................... G06N 3/09
(Continued)

FOREIGN PATENT DOCUMENTS

JP     2008-022103 A     1/2008
JP     2012-070283 A     4/2012
(Continued)

OTHER PUBLICATIONS

X. Li, B. Zhao and X. Lu, "A General Framework for Edited Video and Raw Video Summarization," in IEEE Transactions on Image Processing, vol. 26, No. 8, pp. 3652-3664, Aug. 2017, doi: 10.1109/TIP.2017.2695887. (Year: 2017).*
(Continued)

*Primary Examiner* — Hadi Akhavannik
(74) *Attorney, Agent, or Firm* — Sughrue Mion, PLLC

(57) ABSTRACT

In a video processing device, a video acquisition means acquires a material video. An importance calculation means calculates importance in the material video using a plurality of models. An importance integration means integrates the importance calculated using the plurality of models. A generation means extracts important scenes in the material video based on the integrated importance and generates a digest video including the extracted important scenes.

9 Claims, 15 Drawing Sheets

(58) Field of Classification Search
CPC ........ G06V 10/00; G06V 10/10; G06V 10/20;
G06V 10/40; G06V 10/70; G06V 10/88;
G06V 10/96; G06V 10/98
See application file for complete search history.

(56) References Cited

U.S. PATENT DOCUMENTS

| | | | |
|---|---|---|---|
| 2012/0076357 A1* | 3/2012 | Yamamoto | H04N 21/8549 |
| | | | 382/103 |
| 2019/0114485 A1* | 4/2019 | Chan | H04N 21/4662 |
| 2020/0126244 A1 | 4/2020 | Lee | |
| 2021/0279603 A1* | 9/2021 | Teran Matus | G06V 20/40 |
| 2023/0179817 A1* | 6/2023 | Kikuchi | H04N 5/91 |
| | | | 725/34 |
| 2023/0206635 A1* | 6/2023 | Nabeto | G06V 20/46 |
| | | | 386/241 |

FOREIGN PATENT DOCUMENTS

| | | | |
|---|---|---|---|
| JP | 2014-229092 A | | 12/2014 |
| JP | 2021174117 A | * | 11/2021 |
| KR | 20180093582 A | | 8/2018 |

OTHER PUBLICATIONS

Li, 2017 (Year: 2017).*
JP Office Action for JP Application No. 2022-527348, mailed on Oct. 10, 2023 with English Translation.
International Search Report for PCT Application No. PCT/JP2020/020867, mailed on Sep. 1, 2020.

* cited by examiner

<AT THE TIME OF TRAINING>

<AT THE TIME OF INFERENCE>

VIDEO PROCESSING DEVICE, VIDEO PROCESSING METHOD, TRAINING DEVICE, TRAINING METHOD, AND RECORDING MEDIUM

This application is a National Stage Entry of PCT/JP2020/020867 filed on May 27, 2020, the contents of all of which are incorporated herein by reference, in their entirety.

TECHNICAL FIELD

The present invention relates to processing of video data.

BACKGROUND ART

There has been proposed a technique for generating a video digest from moving images. Patent Document 1 discloses a highlight extraction device that creates learning data files from a training moving image prepared in advance and important scene moving images specified by a user, and detects important scenes from a target moving image based on the learning data files.

PRECEDING TECHNICAL REFERENCES

Patent Document

Patent Document 1: Japanese Patent Application Laid-Open under No. JP 2008-022103

SUMMARY

Problem to be Solved by the Invention

In a digest video edited by a human, in addition to the important scenes, the scene close to the important scene is often used. For example, for a home run scene of baseball, in addition to the scene in which the batter hits a home run, the scene in which the pitcher pitches, the scene in which the batter runs base, or the like are often included in the digest video. In this regard, by the method of automatically extracting important scenes using machine learning, it is difficult to appropriately include scenes close to the important scenes into the digest video.

It is an object of the present invention to provide a video processing device capable of generating a digest video that includes related scenes close to the important scenes.

Means for Solving the Problem

According to an example aspect of the present invention, there is provided a video processing device comprising:
  a video acquisition means configured to acquire a material video;
  an importance calculation means configured to calculate importance in the material video using a plurality of models;
  an importance integration means configured to integrate the importance calculated using the plurality of models; and
  a generation means configured to extract important scenes in the material video based on the integrated importance and generate a digest video including the extracted important scenes.

According to another example aspect of the present invention, there is provided a video processing method comprising:
  acquiring a material video;
  calculating importance in the material video using a plurality of models;
  integrating the importance calculated using the plurality of models; and
  extracting important scenes in the material video based on the integrated importance and generating a digest video including the extracted important scenes.

According to still another example aspect of the present invention, there is provided a recording medium recording a program, the program causing a computer to perform processing comprising:
  acquiring a material video;
  calculating importance in the material video using a plurality of models;
  integrating the importance calculated using the plurality of models; and
  extracting important scenes in the material video based on the integrated importance and generating a digest video including the extracted important scenes.

According to still another example aspect of the present invention, there is provided a training device comprising:
  a video acquisition means configured to acquire a training material video;
  a correct answer data acquisition means configured to acquire basic correct answer data in which correct answer tags are given to important scenes in the training material video;
  a correct answer data generation means configured to generate additional correct answer data to be used in training different models from the basic correct answer data; and
  a training means configured to perform training of a plurality of models using the training material video and the correct answer data.

According to still another example aspect of the present invention, there is provided a training method comprising:
  acquiring a training material video;
  acquiring basic correct answer data in which correct answer tags are given to important scenes in the training material video;
  generating additional correct answer data to be used in training different models from the basic correct answer data; and
  performing training of a plurality of models using the training material video and the correct answer data.

According to still another example aspect of the present invention, there is provided a recording medium recording a program, the program causing a computer to perform processing comprising:
  acquiring a training material video;
  acquiring basic correct answer data in which correct answer tags are given to important scenes in the training material video;
  generating additional correct answer data to be used in training different models from the basic correct answer data; and
  performing training of a plurality of models using the training material video and the correct answer data.

Effect of the Invention

According to the present invention, it becomes possible to generate a digest video including related scenes close to important scenes.

EXAMPLE EMBODIMENTS

Preferred example embodiments of the present invention will be described with reference to the accompanying drawings.

<Basic Configuration>

First, a basic configuration of the digest generation device according to the example embodiments will be described.

[Overall Configuration]

Figure 1:
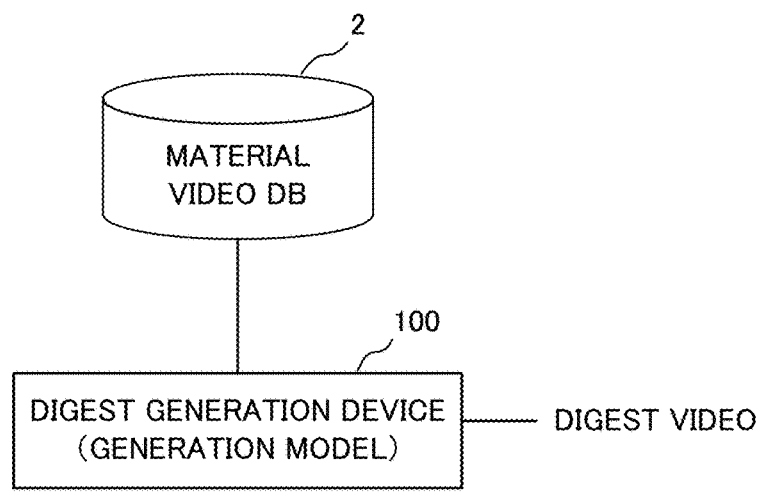
FIG. 1 illustrates an overall configuration of a digest generation device according to an example embodiment.

FIG. 1 illustrates an overall configuration of the digest generation device 100 according to the example embodiments. The digest generation device 100 is connected to a material video database (hereinafter, "database" is also referred to as "DB") 2. The material video DB 2 stores various material videos, i.e., moving images. For example, the material video may be a video such as a television program broadcasted from a broadcasting station, a video that is distributed on the Internet, and the like. It is noted that the material video may or may not include sound.

The digest generation device 100 generates and outputs a digest video using multiple portions of the material video stored in the material video DB 2. The digest video is a video generated by connecting important scenes in the material video in time series. The digest generation device 100 generates a digest video using digest generation models (hereinafter simply referred to as "generation models") trained by machine learning. As the generation model, for example, a model using a neural network can be used.

Figure 2:
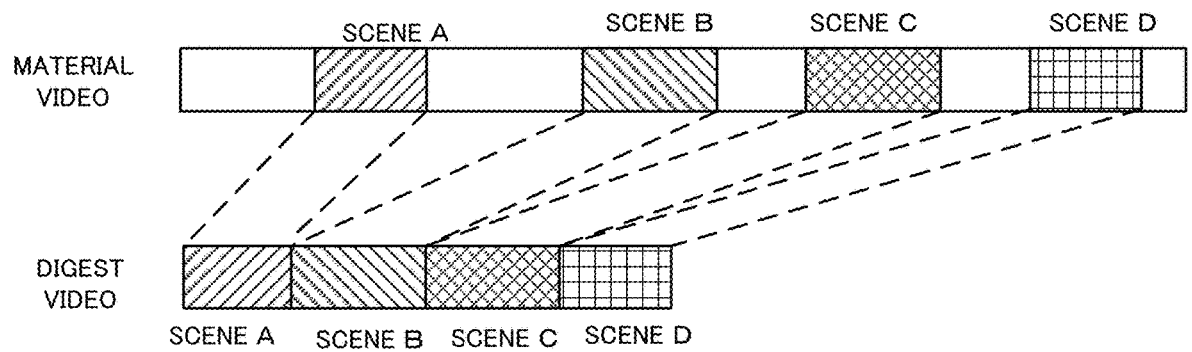
FIG. 2 illustrates an example of a digest video.

FIG. 2 shows an example of a digest video. In the example of FIG. 2, the digest generation device 100 extracts scenes A to D included in the material video as the important scenes, and generates a digest video by connecting the important scenes in time series. Incidentally, the important scene extracted from the material video may be repeatedly used in the digest video in dependence upon its content.

[Functional Configuration]

Figure 3A:
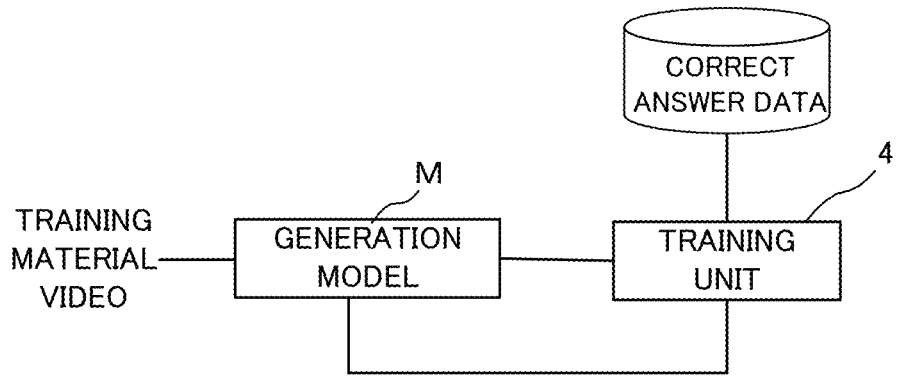
FIGS. 3A and 3B illustrate configurations of the digest generation device at the time of training and inference.

FIG. 3A is a block diagram illustrating a configuration for training a generation model used by the digest generation device 100. Training datasets prepared in advance are used to train the generation model. The training dataset is a pair of a training material video and correct answer data showing a correct answer for the training material video. The correct answer data is data obtained by giving a tag (hereinafter referred to as "a correct answer tag") indicating the correct answer to the position of the important scene in the training material video. Typically, giving of the correct answer tags to the correct answer data is performed by an experienced editor or the like. For example, for a material video of baseball broadcasting, a baseball commentator or the like selects highlight scenes during the game and give the correct answer tags. Also, the correct answer tag may be automatically given by learning a method of giving the correct answer tags by the editor using machine learning or the like.

At the time of training, the training material video is inputted to the generation model M. The generation model M extracts the important scenes from the material video. Specifically, the generation model M extracts the feature quantity from one frame or a set of multiple frames forming the material video, and calculates the importance (importance score) for the material video based on the extracted feature quantity. Then, the generation model M outputs a portion where the importance is equal to or higher than a predetermined threshold value as an important scene. The training unit 4 optimizes the generation model M using the output of the generation model M and the correct answer data. Specifically, the training unit 4 compares the important scene outputted by the generation model M with the scene indicated by the correct answer tag included in the correct answer data, and updates the parameters of the generation model M so as to reduce the error (loss). The trained generation model M thus obtained can extract scenes close to the scene to which the editor gives the correct answer tag as an important scene from the material video.

Figure 3B:
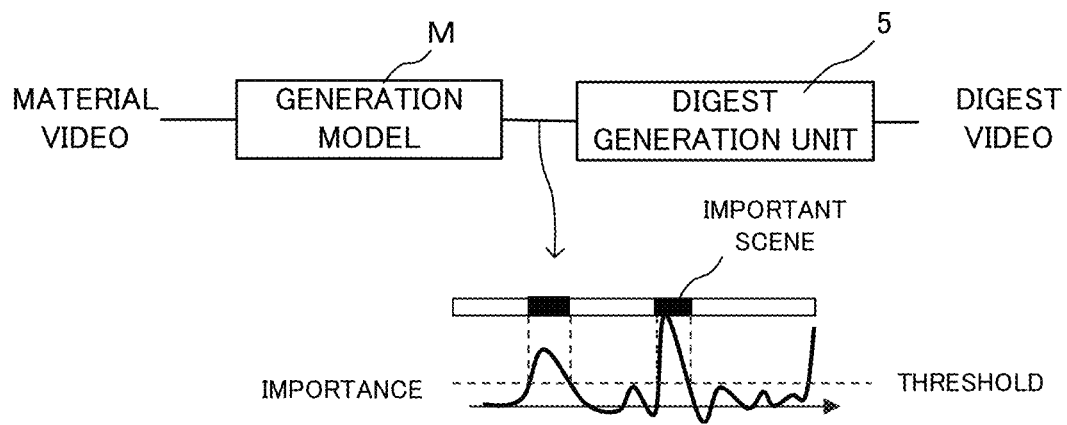

FIG. 3B illustrates a configuration of the digest generation device 100 at the time of inference. At the time of inference, the material video subjected to the generation of the digest video is inputted to the trained generation model M. The generation model M calculates the importance from the material video, extracts the portions where the importance is equal to or higher than a predetermined threshold value as the important scenes, and outputs them to the digest generation unit 5. The digest generation unit 5 generates and outputs a digest video by connecting the important scenes extracted by the generation model M. Thus, the digest generation device 100 generates a digest video from the material video using the trained generation model M.

[Hardware Configuration]

Figure 4:
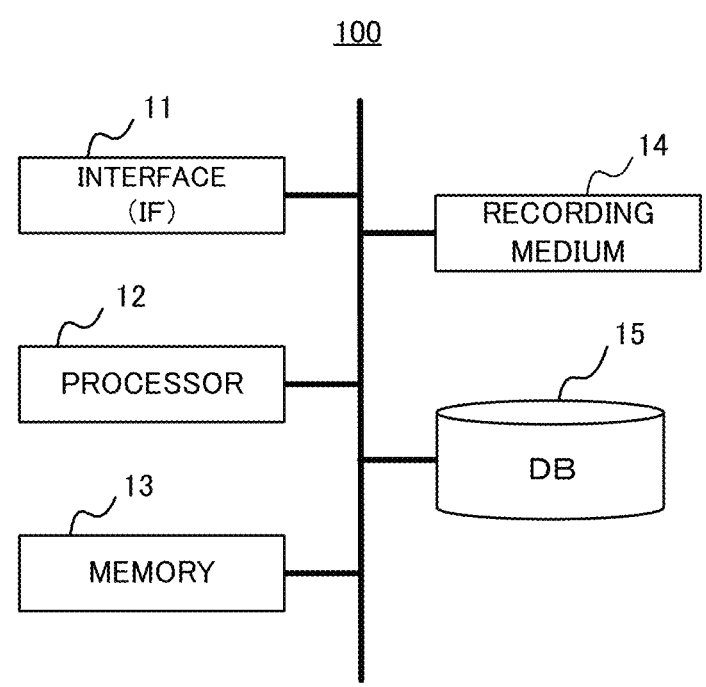
FIG. 4 is a block diagram illustrating a hardware configuration of a digest generation device.

FIG. 4 is a block diagram illustrating a hardware configuration of the digest generation device 100. As illustrated, the digest generation device 100 includes an interface (IF) 11, a processor 12, a memory 13, a recording medium 14, and a DB 15.

The IF 11 inputs and outputs data to and from external devices. Specifically, the material video stored in the material video DB 2 is inputted to the digest generation device 100 via the IF 11. Further, the digest video generated by the digest generation device 100 is outputted to an external device through the IF 11.

The processor 12 is a computer, such as a CPU (Central Processing Unit), and controls the entire digest generation device 100 by executing a previously prepared program. Specifically, the processor 12 executes training processing and digest generation processing which will be described later.

The memory 13 is a ROM (Read Only Memory), a RAM (Random Access Memory), and the like. The memory 13 is also used as a work memory during the execution of various processing by the processor 12.

The recording medium 14 is a non-volatile, non-transitory recording medium such as a disk-shaped recording medium, a semiconductor memory, or the like, and is configured to be detachable from the digest generation device 100. The recording medium 14 records various programs to be executed by the processor 12. When the digest generation device 100 executes various kinds of processing, the program recorded on the recording medium 14 is loaded into the memory 13 and executed by the processor 12.

The data base 15 temporarily stores the material video inputted through the IF 11, the digest video generated by the digest generation device 100, and the like. The database 15 also stores information on the trained generation model used by the digest generation device 100, and the training data sets used for training the generation models. Incidentally, the digest generation device 100 may include an input unit such as a keyboard and a mouse, and a display unit such as a liquid crystal display for the editor to perform instructions and inputs.

First Example Embodiment

Next, a first example embodiment of the present invention will be described.

[Principle]

Figure 5:
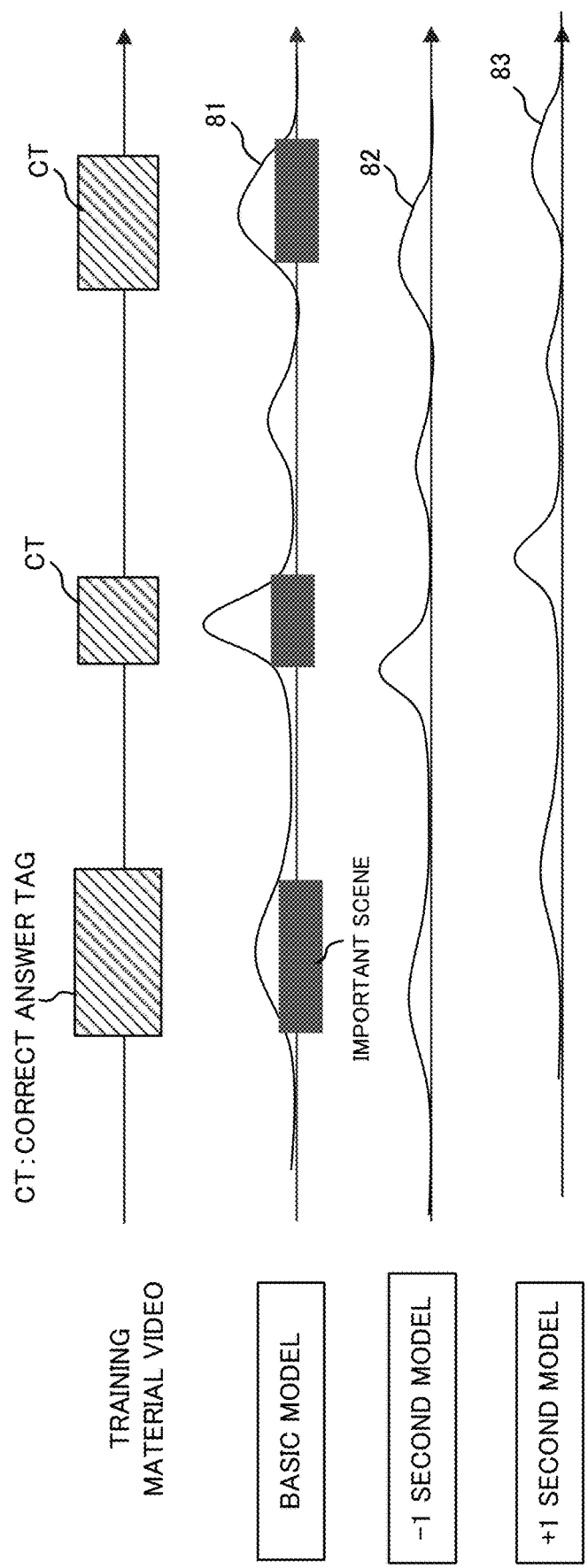
FIG. 5 schematically illustrates processing of a plurality of generation models used in the first example embodiment.

The first example embodiment generates a digest video including the scene around the important scene using a plurality of generation models trained using the correct answer data obtained by shifting the temporal position of the correct answer tag. FIG. 5 schematically illustrates the processing of a plurality of generation models used in the first example embodiment. As described above, the correct answer data in which the correct answer tags CT are given to the training material video (hereinafter, referred to as "basic correct answer data.") is prepared. The basic generation model (hereinafter referred to as the "basic model") is trained using the basic correct answer data to calculate the importance shown in the graph 81. The basic model outputs the high importance at a position corresponding to the correct answer tag CT in the basic correct answer data.

In addition, in the first example embodiment, the correct answer data obtained by shifting the positions of the correct answer tags in the basic correct answer data for a predetermined time on the time axis (hereinafter, referred to as "additional correct answer data.") is generated, and another generation model (hereinafter, also referred to as "shift model.") is trained using it. In the example of FIG. 5, the shift model (hereinafter referred to as the "−1 second model") is trained using the correct answer data obtained by shifting the position of the correct answer tags to the earlier side by one second on the time axis. Thus, as shown in FIG. 5, the importance 82 calculated by the −1 second model becomes high at the earlier position in time than the correct answer tag CT. That is, the −1 second model is trained to detect a portion one second before the position of the correct answer tag in the basic correct answer data, and becomes a model to detect the position of one second before the important scene. In other words, the important scene exists one second after the scene that the −1 second model detected.

In the example of FIG. 5, another shift model (hereinafter referred to as the "+1 second model") is also trained using the correct answer data obtained by shifting the position of the correct answer tags to the later side by one second on the time axis. Thus, as shown in FIG. 5, the importance 83 calculated by the +1 second model becomes high at a later position in time than the correct answer tag CT. That is, the +1 second model is trained to detect a portion one second after the position of the correct answer tag in the basic correct answer data, and becomes a model to detect the position of one second after the important scene. In other words, the important scene exists one second before the scene that the +1 second model detected.

Thus, by training another generation model using the additional correct answer data obtained by shifting the position of the correct answer tag by a predetermined time (N seconds) in the forward and backward directions on the time axis in the basic correct answer data, it is possible to extract scenes deviated by the predetermined time from the important scene in the forward and backward directions.

Figure 6:
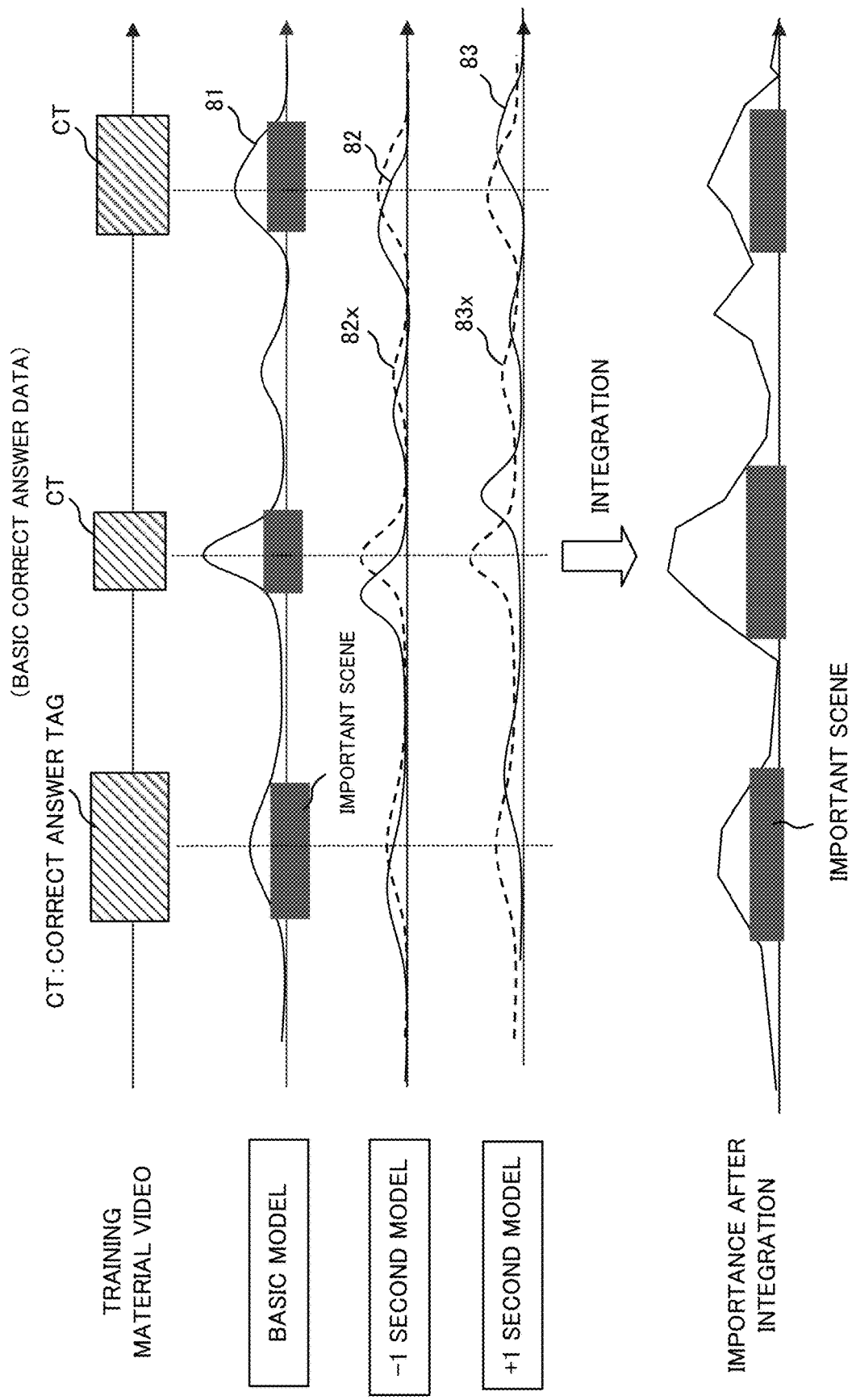
FIG. 6 illustrates an example of integrating importance calculated by each model in the first example embodiment.

After training a plurality of models in this manner, at the time of inference, the digest generation device 100 integrates the importance outputted by each model to extract the important scenes. Specifically, the digest generation device 100 adds the importance calculated by the basic model and the shift models. At that time, the importance calculated by each shift model is added as the importance with respect to the position of the correct answer tag in the basic correct answer data. FIG. 6 illustrates an example of integrating the importance calculated by each model. The importance 81 calculated by the basic model is used as a reference. The importance 82 calculated by the −1 second model is added to the importance 81 calculated by the basic model after being shifted backward by one second on the time axis, as shown by the dashed line 82x. The importance 83 calculated by the +1 second model is added to the importance 81 calculated by the basic model after being shifted forward by one second on the time axis, as shown by the dashed line 83x.

Thus, when the shift model calculates high importance, the importance is added as the importance at the position of the correct answer tag before the shift. Thus, if there is a related scene near the important scene, the importance of that related scene is added to the importance of the important scene, and the importance after integration becomes high even before and after the important scene, as shown in FIG. 6. As a result, it becomes likely that a video section including the important scene and the related scene near the important scene is extracted as the important scene.

As a specific example, it is assumed that the training material video is a video of baseball broadcasting and includes a home run scene. It is assumed that the material video includes the pitching scene of the pitcher before the scene in which the batter hits the home run (hereinafter referred to as "ball hit scene"). In the basic correct answer data, it is assumed that the correct answer tag is given to the ball hit scene. In this case, the basic model calculates high importance at the ball hit scene. Here, assuming that there is a pitching scene of the pitcher one second before the ball hit scene, the −1 second model detects the pitching scene of the pitcher and calculates high importance. This importance is added to the importance that the basic model calculated at the ball hit scene. Similarly, assuming that there is a hitter's base-run scene one second after the ball hit scene, the +1 second model detects the base-run scene and calculates high importance. This importance is added to the importance that the basic model calculated at the ball hit scene. In this manner, in the first example embodiment, when there is a related scene such as a pitching scene or a base-run scene near the ball hit scene in the material video, the importance of the ball hit scene is increased, and it becomes possible to extract the important scene including the scene close to the important scene.

[Training Device]

(Functional Configuration)

Figure 7:
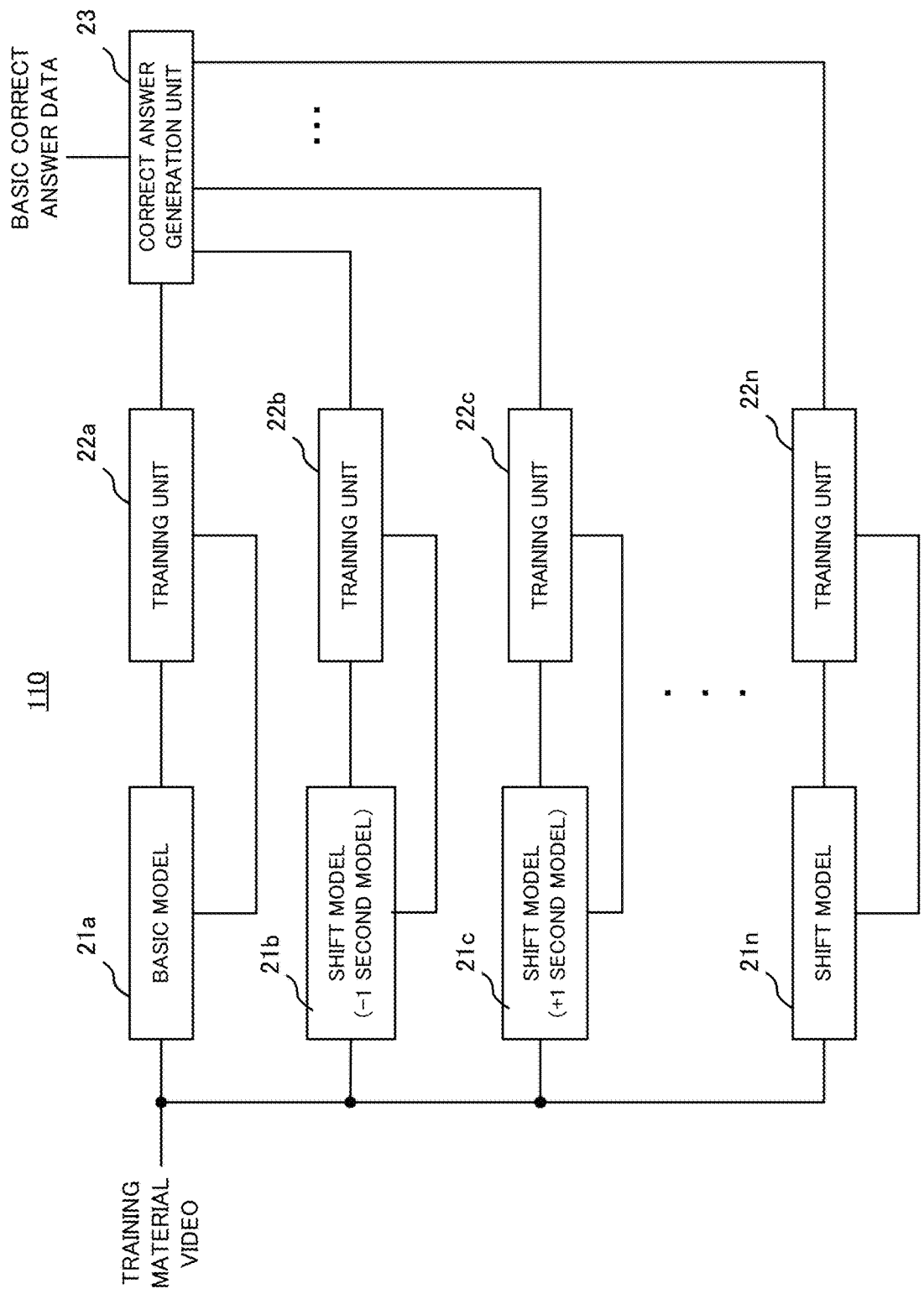
FIG. 7 is a block diagram illustrating a functional configuration of a training device according to the first example embodiment.

FIG. 7 is a block diagram showing a functional configuration of the training device 110 according to the first example embodiment. The training device 110 is a device for training a basic model and shift models, and includes a basic model 21a, a plurality of shift models 21b-21n, training units 22a-22n, and a correct answer generation unit 23. The basic model 21a is a generation model that is trained using the basic correct answer data as described above, and the shift models 21b-21n are generation models trained using the correct answer data obtained by shifting the basic correct answer data by a predetermined time on the time axis.

The correct answer generation unit 23 outputs the basic correct answer data prepared in advance to the training unit 22a as it is. Further, the correct answer generation unit 23 generates additional correct answer data by shifting the basic correct answer data forward and backward by a predetermined time on the time axis, and outputs the additional correct answer data to the training units 22b-22n. For example, when the shift model 21b is the −1 second model described above, the correct answer generation unit 23 generates the additional correct answer data by shifting the basic correct answer data forward by one second on the time axis, and outputs it to the training unit 22b. Also, when the shift model 21c is the +1 second model described above, the correct answer generation unit 23 generates the additional correct answer data by shifting the basic correct answer data backward by one second on the time axis, and outputs it to the training unit 22c.

The basic model 21a and the shift models 21b-21n are provided with the training material video. The basic model 21a and the shift models 21b-21n calculate the importance from the inputted training material video and output them to the training units 22a-22n. The training unit 22a optimizes the basic model 21a using the importance outputted by the basic model 21a and the basic correct answer data. Specifically, the training unit 22a extracts the important scene based on the importance outputted by the basic model 21a, calculates the loss by comparing the importance with the correct answer tag included in the basic correct answer data, and updates the parameters of the basic model 21a so that the loss is reduced. Similarly, the training units 22b-22n optimize the shift models 21b-21n using the importance outputted by the shift models 21b-21n and the additional correct answer data generated by the correct answer generation unit 23, respectively. Specifically, the training units 22b-22n extract the important scenes based on the importance outputted by the shift models 21b-21n, calculate the losses by comparing the importance with the correct answer tags included in the additional correct answer data generated by the correct answer generation unit 23, and update the parameters of the shift models 21b-21n so that the losses are reduced, respectively. Thus, the basic model 21a and shifted models 21b-21n such as the −1 second model and the +1 second model are trained.

In the above configuration, the correct answer generation unit 23 is an example of the correct answer data acquisition means and the correct answer data generation means, and each of the training units 22a-22n is an example of the training means.

(Training Processing)

Figure 8:
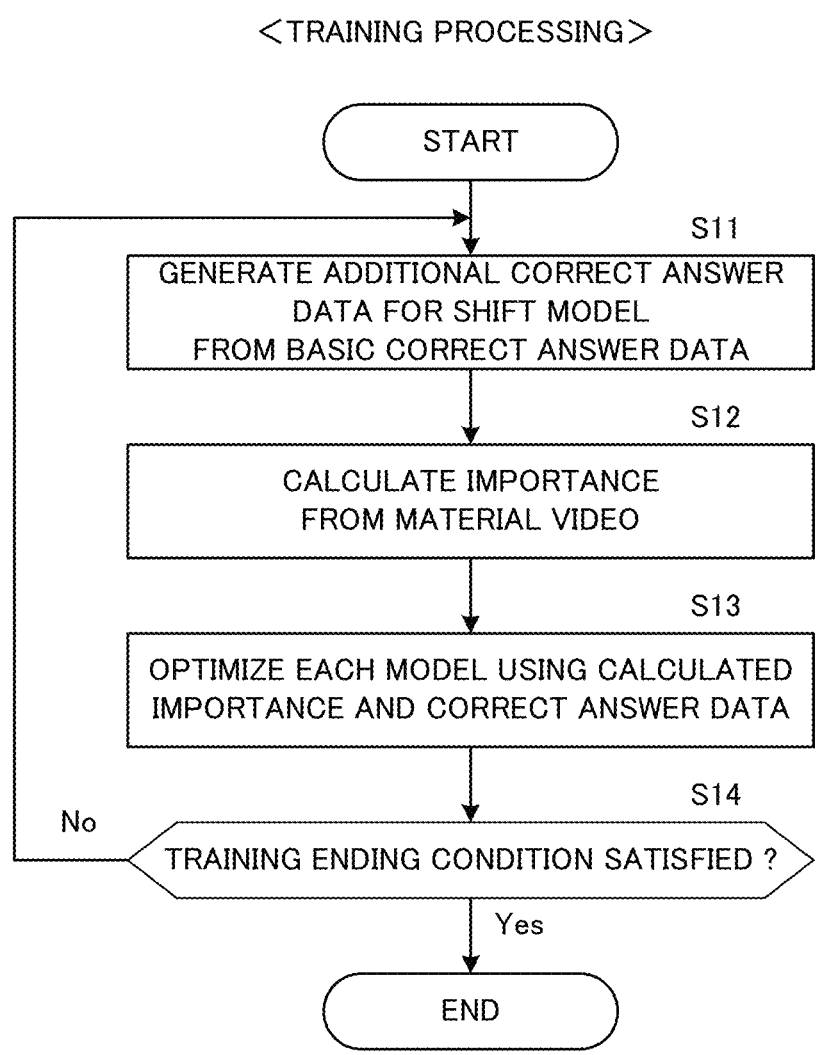
FIG. 8 is a flowchart of a training processing by the training device of the first example embodiment.

FIG. 8 is a flowchart of training processing by the training device 110. This processing is actually realized by the processor 12 shown in FIG. 4, which executes a program prepared in advance and operates as each element shown in FIG. 7. First, the correct answer generation unit 23 generates the additional correct answer data for each shift model 21b-21n from the basic correct answer data (step S11). Next, the basic model 21a and the shift models 21b-21n calculate the importance from the training material video (step S12). Next, the training units 22a-22n optimize each model using the importance outputted from each model and the correct answer data inputted from the correct answer generation unit 23 (step S13).

Next, the training device 110 determines whether or not the training ending condition is satisfied (step S14). For example, the training ending condition is that all the training data sets prepared in advance are used, that the value of the loss calculated by the training units 22a-22n converged within a predetermined range, and the like. Training of the basic model 21a and the shift models 21b-21n is performed until the training ending condition is satisfied, and the training processing ends when the training ending condition is satisfied.

[Digest Generation Device]

(Functional Configuration)

Figure 9:
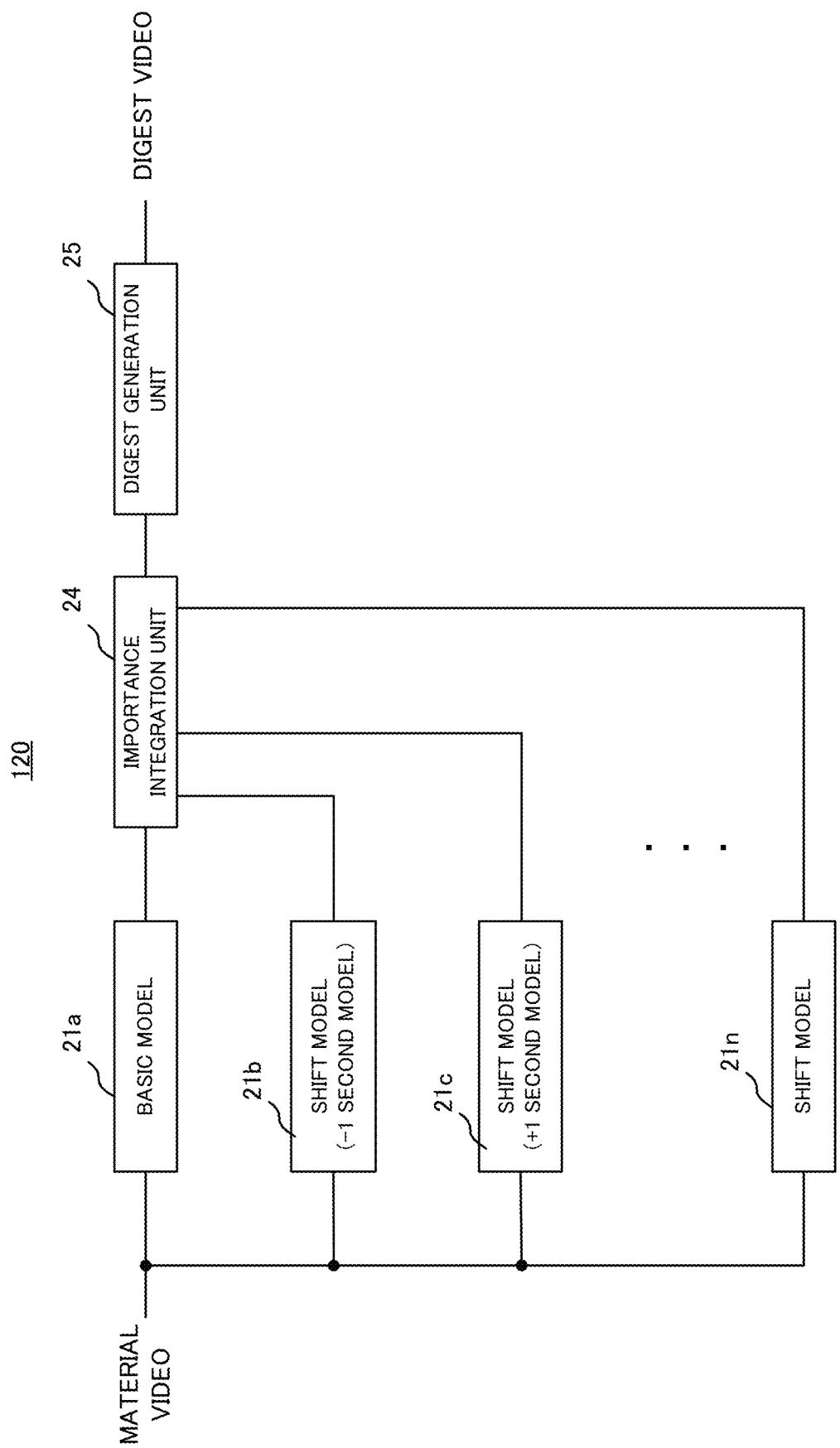
FIG. 9 is a block diagram illustrating a functional configuration of a digest generation device according to the first example embodiment.

FIG. 9 is a block diagram illustrating a functional configuration of a digest generation device 120 according to the first example embodiment. The digest generation device 120 includes the basic model 21a, the shift models 21b-21n, an importance integration unit 24, and a digest generation unit 25. Incidentally, the basic model 21a and the shift models 21b-21n are the models trained by the training device 110 described above.

The basic model 21a and the shift models 21b-21n are provided with a material video subjected to the generation of the digest video. The basic model 21a calculates the importance from the material video and outputs the importance to the importance integration unit 24. Similarly, the shift models 21b-21n calculate the importance from the material video and outputs the importance to the importance integration unit 24, respectively.

The importance integration unit 24 adds the importance calculated by each of the shift models 21b-21n to the importance calculated by the basic model 21a in accordance with the time base in the basic correct answer data. Specifically, the importance integration unit 24 adds the importance calculated by the shift model 21b, which is the −1 second model, to the importance calculated by the basic model 21a by delaying it by one second. Similarly, the importance integration unit 24 adds the importance calculated by the shift model 21c, which is the +1 second model, to the importance calculated by the basic model 21a by advancing it by one second. Then, the importance integration unit 24 integrates the importance computed by the basic model 21a and the shift models 21b-21n, extracts the scenes whose importance is equal to or higher than a predetermined threshold value as the important scenes, and outputs the important scenes to the digest generation unit 25.

The digest generation unit 25 generates a digest video by connecting the important scenes extracted by the importance integration unit 24 in time series, and outputs the digest video. Thus, in the digest generation device 120 of the first example embodiment, since the related scene existing close to the important scene is detected by the shift model and the video section including the related scene is extracted as the important scene, it is possible to generate a digest video including the scene existing before and after the important scene.

In the above configuration, the basic model 21a and the shift models 21b-21n are examples of the importance calculation means, the importance integration unit 24 is an example of the importance integration means, and the importance integration unit 24 and the digest generation unit 25 are examples of the generation means.

(Digest Generation Processing)

Figure 10:
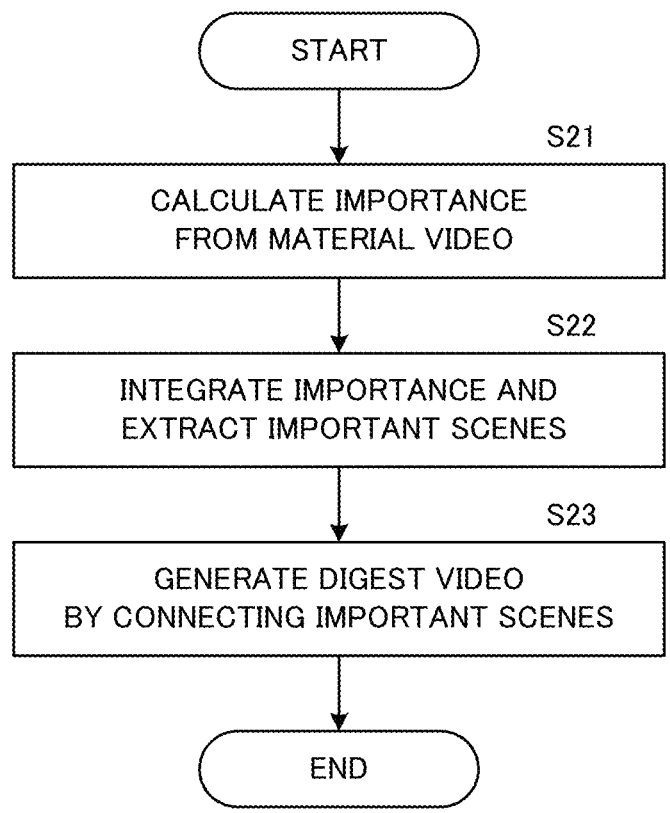
FIG. 10 is a flowchart of digest generation processing of the first example embodiment.

FIG. 10 is a flowchart of the digest generation processing by the digest generation device 120. This processing is actually realized by the processor 12 shown in FIG. 4, which executes a program prepared in advance and operates as each element shown in FIG. 9.

First, the basic model 21a and the shift models 21b-21n calculate the importance from the material video and output the importance to the importance integration unit 24 (step S21). The importance integration unit 24 integrates the importance inputted from the basic model 21a and the shift models 21b-21n, and extracts the scenes whose importance is equal to or higher than a predetermined threshold value as the important scenes (step S22). Next, the digest generation unit 25 generates a digest video by connecting the extracted important scenes in time series (step S23). Then, the processing ends.

Second Example Embodiment

Next, a second example embodiment of the present invention will be described.

[Principle]

Figure 11:
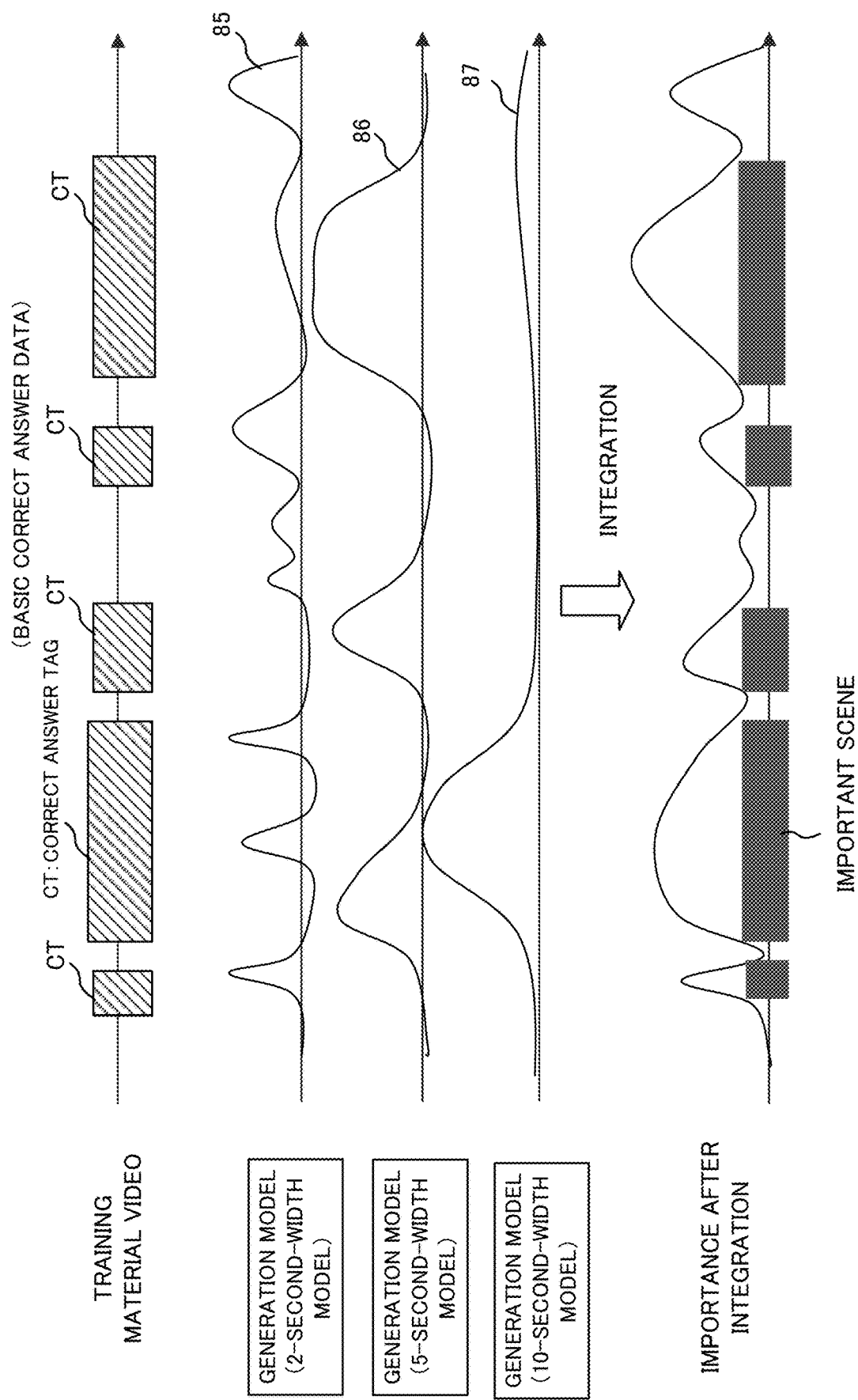
FIG. 11 schematically illustrates a plurality of generation models used in a second example embodiment.

In the second example embodiment, the material video is formed as a set of video sections of a predetermined time width, and the correct answer tag is given to correct answer data by the units of the same predetermined time width. Then, a plurality of generation models are trained using the correct answer data to which correct answer tags of different time widths are given. FIG. 11 schematically illustrates the processing of a plurality of generation models used in the second example embodiment. In the example of FIG. 11, a 2-second-width model, a 5-second-width model, and a 10-second-width model are generated.

Specifically, first, as described above, the basic correct answer data in which the correct answer tags CT are given to the training material video is prepared. Next, material videos composed of video sections of different time widths are generated from the training material video. In the example of FIG. 11, a training material video is divided into the video sections of 2 seconds to generate 2-second-width training material video. Similarly, a 5-second-width training material video and a 10-second-width training material video are generated. Next, for the 2-second-width training material video, the 2-second-width correct answer data is generated by giving the correct answer tags of 2-second-width by referring to the basic correct answer data. Similarly, for the 5-second-width training material video, 5-second-width correct answer data is generated by giving the correct answer tags of 5-second-width by referring to the basic correct answer data. Further, for the 10-second-width training material video, 10-second-width correct answer data is generated by giving the correct answer tags of 10-second-width by referring to the basic correct answer data.

When the training material videos and correct answer data of each time width are generated in this manner, each generation model is trained using them. Specifically, the generation model of 2-second-width (hereinafter referred to as "2-second-width model") is trained using the 2-second-width training material video and the 2-second-width correct answer data. Similarly, the generation model of 5-second-width (hereinafter referred to as "5-second-width model") and the generation model of 10-second-width (hereinafter referred to as "10-second-width model") are also trained. Thus, multiple trained generation models with different time widths are obtained. The 2-second-width model thus obtained has the ability to extract the event of about 2 seconds in the material video as the important scene. Similarly, the 5-second-width model has the ability to extract the event of about 5 seconds as the important scene, and the 10-second-width model has the ability to extract the event of about 10 seconds as the important scene. Therefore, by using multiple generation models having different time widths, it becomes possible to extract the events of different time widths in the material video as the important scenes.

At the time of inference, i.e. generation of the digest video, as shown in FIG. 11, each generation model calculates the importance from the material video subjected to the generation, and the important scenes are extracted based on the importance obtained by integrating them. This makes it possible to extract the important scenes of different time widths, such as 2-second-width, 5-second-width, and 10-second-width, from the material video. For example, in the aforementioned example of the home run scene, in addition to the ball hit scene, it is possible to extract the pitching scene and the base-run scene close to the ball hit scene as the important scenes.

[Training Device]

(Functional Configuration)

Figure 12:
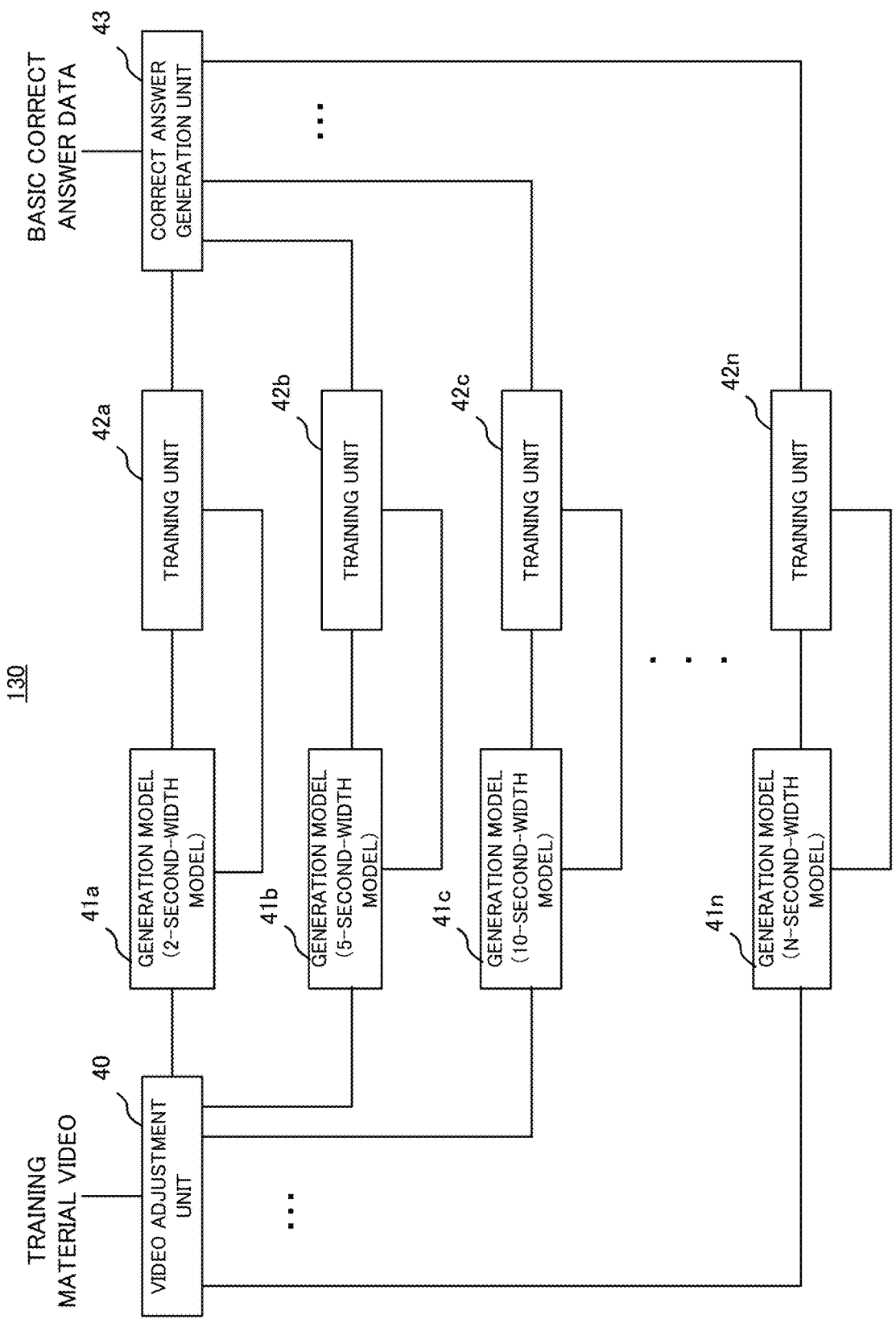
FIG. 12 is a block diagram showing a functional configuration of a training device according to the second example embodiment.

FIG. 12 is a block diagram illustrating a functional configuration of the training device 130 according to the second example embodiment. The training device 130 is a device for training the generation models, and includes a video adjustment unit 40, a plurality of generation models 41a-41n, training units 42a-42n, and a correct answer generation unit 43. It is noted that the generation model 41a is a 2-second-width model, the generation model 41b is a 5-second-width model, the generation model 41c is a 10-second-width model, and the generation model 41n is an N-second-width model.

The video adjustment unit 40 divides the training material video into 2-second video sections to generate a 2-second-width material video and outputs it to the generation model 41a. Similarly, the video adjustment unit 40 generates material videos of 5-second-width, 10-second-width to N-second-width from the training material video and outputs them to the generation models 41b-41n, respectively.

The correct answer generation unit 43 generates, from the basic correct answer data prepared in advance, the correct answer data to which the correct answer tags of 2-second-width are given, and outputs the generated correct answer data to the the training unit 42a. Similarly, the correct answer generation unit 43 generates, from the basic correct answer data, the correct answer data to which the correct answer tags of 5-second-width, 10-second-width to N-second-width are given and outputs them to the training unit 42b-42n, respectively.

The generation models 41a-41n calculate the importance from the inputted training material videos and outputs them to the training unit 42a-42n, respectively. The training unit 42a optimizes the generation model 41a using the importance outputted by the generation model 41a and the correct answer data of 2-second-width. Specifically, the training unit 42a extracts the important scene based on the importance outputted by the generation model 41a, calculates the loss by comparing the importance of the important scene with the correct answer tags included in the correct answer data of 2-second-width, and updates the parameters of the generation model 41a so that the loss is reduced. Similarly, the training units 42b-42n optimize the generation models 41b-41n using the importance outputted by the generation models 41b-41n and the correct answer data of the respective time-widths generated by the correct answer generation unit 43. Specifically, the training units 42b-42n extract the important scenes based on the importance outputted by the generation models 41b-41n, calculates the loss by comparing the importance of the important scenes with the correct answer tags included in the correct answer data of the respective time widths generated by the correct answer generating section 23, and update the parameters of the generation models 41b-41n so that the losses are reduced. Thus, the generation models 41a-41n are trained.

In the above configuration, the correct answer generation unit 43 is an example of the correct answer data acquisition means and the correct answer data generation means, and each of the training unit 42a-42n is an example of the training means.

(Training Processing)

Figure 13:
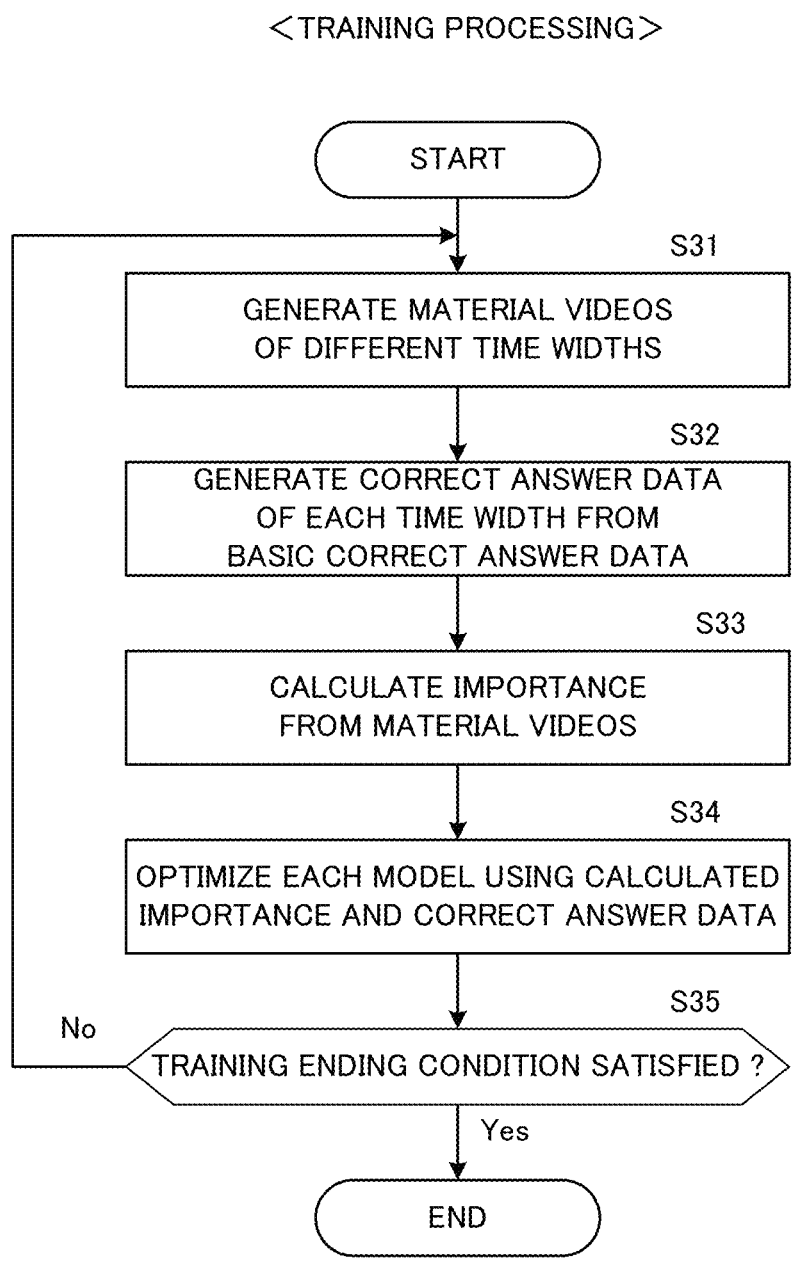
FIG. 13 is a flowchart of training processing of the second example embodiment.

FIG. 13 is a flowchart of training processing by the training device 130. This processing is actually achieved by the processor 12 shown in FIG. 4, which executes a program prepared in advance and operates as each element shown in FIG. 12. First, the video adjustment unit 40 generates the material videos of time widths corresponding to each of the generation models 41a-41n from the training material video, and outputs them to the generation models 41a-41n (step S31). Next, the correct answer generation unit 43 generates the correct answer data for each of the generation models 41a-41n from the basic correct answer data (step S32). Next, the generation models 41a-41n calculate the importance from the inputted material videos (step S33). Next, the training units 42a-42n optimize the generation models 41a-41n using the importance outputted from the generation models 41a-41n and the correct answer data inputted from the correct answer generation unit 23 (step S34).

Next, the training device 130 determines whether or not the training ending condition is satisfied (step S35). The training ending condition is, for example, that all the training data sets prepared in advance are used, that the value of the loss calculated by the training units 42a-42n converged within a predetermined range, and the like. Training of the generation models 41a-41n is thus performed until the training ending condition is satisfied, and the training processing ends when the training ending condition is satisfied.

[Digest Generation Device]
(Functional Configuration)

Figure 14:
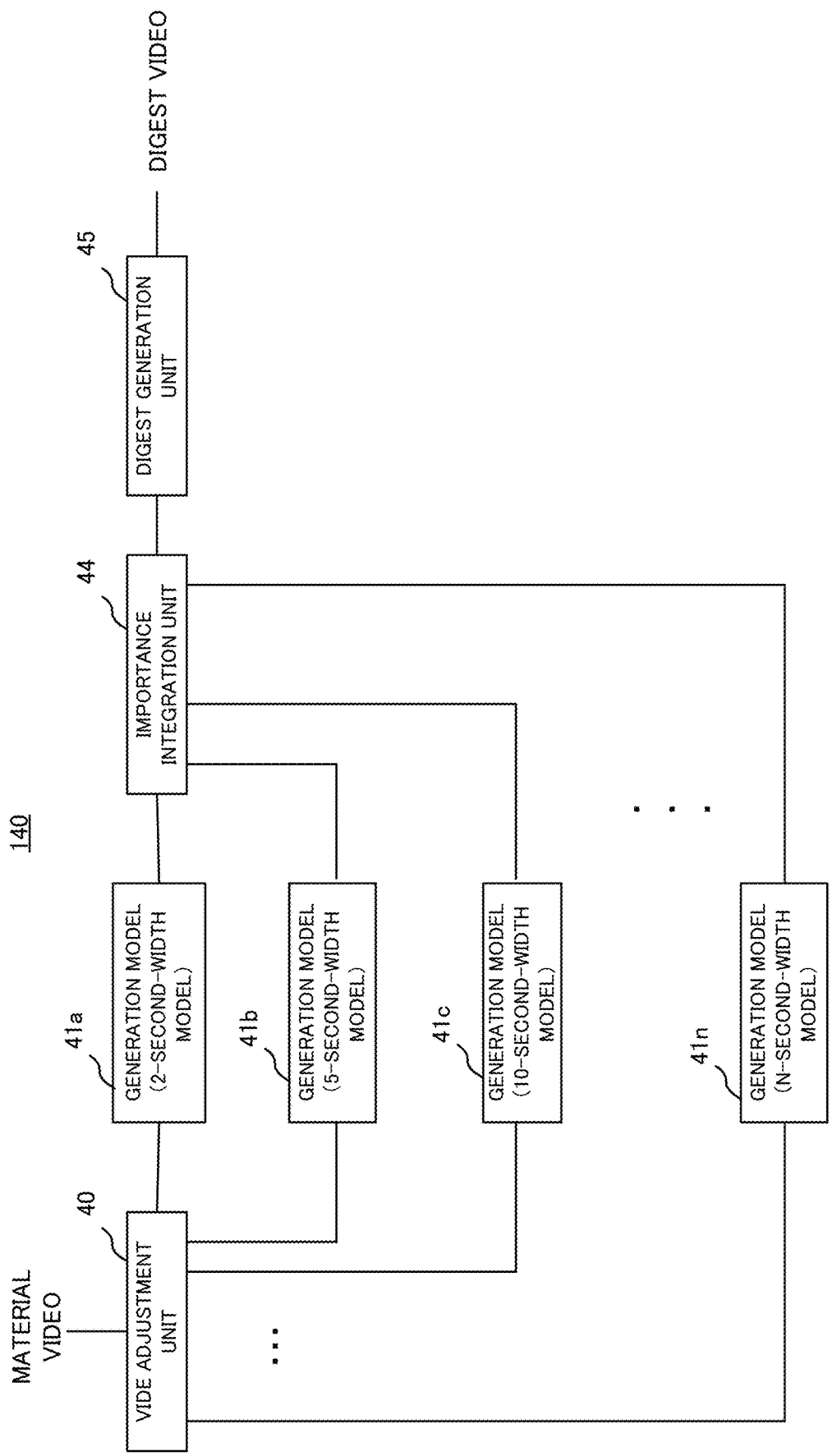
FIG. 14 is a block diagram illustrating a functional configuration of a digest generation device according to the second example embodiment.

FIG. 14 is a block diagram illustrating a functional configuration of the digest generation device 140 according to the second example embodiment. The digest generation device 140 includes a video adjustment unit 40, generation models 41a-41n, an importance integration unit 44, and a digest generation unit 45. Incidentally, the generation models 41a-41n are the models trained by the training device 130 described above.

The video adjustment unit 40 generates the material videos of the 2-second-width, the 5-second-width, and the 10-second-width to N-second-width from the material video subjected to the generation of the digest video, and outputs them to the generation models 41a-41n, respectively. The generation models 41a-41n calculate the importance from the inputted material video and outputs them to the importance integration unit 44.

The importance integration unit 44 integrates the importance calculated by the respective generation models 41a-41n. Specifically, the importance integration unit 44 adds the importance calculated by the generation models 41a-41n, extract the scenes for which the importance obtained by the addition is equal to or higher than a predetermined threshold value as the important scenes, and outputs the important scenes to the digest generation unit 45.

The digest generation unit 45 generates the digest video by connecting the important scenes extracted by the importance integration unit 44 in time series, and outputs the digest video. In the digest generation device 140 of the second example embodiment, since the events of various time widths in the material video are extracted as the important scenes, it is possible to generate a digest video including the scenes existing close to the important scenes.

In the above configuration, the generation models 41a-41n are examples of the importance calculation means, the importance integration unit 44 is an example of the importance integrating means, and the importance integration unit 44 and the digest generation unit 45 are examples of the generation means.

(Digest Generation Processing)

Figure 15:
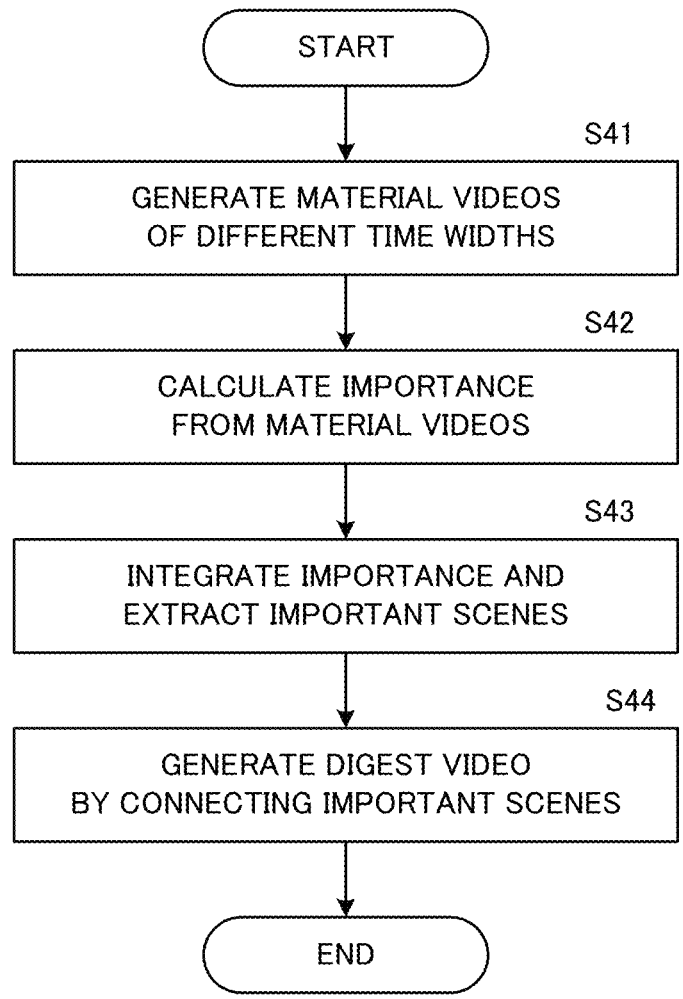
FIG. 15 is a flowchart of the digest generation processing of the second example embodiment.

FIG. 15 is a flowchart of the digest generation processing by the digest generation device 140. This processing is actually realized by the processor 12 shown in FIG. 4, which executes a program prepared in advance and operates as each element shown in FIG. 14.

First, the video adjustment unit 40 generates the material videos of the time widths corresponding to the generation models 41a-41n from the target material video and outputs them to the generation models 41a-41n (step S41). Next, the generation models 41a-41n calculate the importance from the inputted material video and outputs the importance to the importance integration unit 44 (step S42). The importance integration unit 44 integrates the importance inputted from the generation models 41a-41n, and extracts the scenes whose importance is equal to or higher than a predetermined threshold value as the important scenes (step S43). Next, the digest generation unit 45 generates a digest video by connecting the extracted important scenes in time series (step S44). Then, the processing ends.

Third Example Embodiment

Figure 16A:
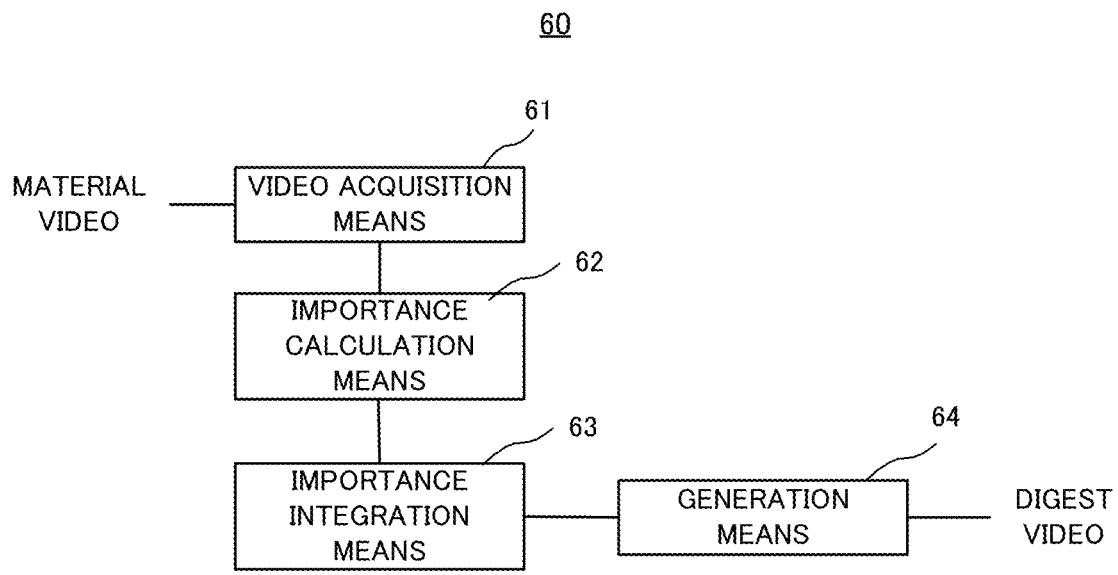
FIGS. 16A and 16B are block diagrams illustrating functional configurations of a video processing device and a training device according to a third example embodiment.

Next, a third example embodiment of the present invention will be described. FIG. 16A is a block diagram illustrating a functional configuration of a video processing device according to a third example embodiment. As shown, the video processing device 60 includes a video acquisition means 61, an importance calculation means 62, an importance integration means 63, and a generation means 64. The image acquisition means 61 acquires a material video. The importance calculation means 62 calculates the importance in the material video using a plurality of models. The importance integration means 63 integrates the importance calculated using the plurality of models. The generation means 64 extracts important scenes in the material video based on the integrated importance and generates a digest video including the extracted important scenes.

Figure 16B:
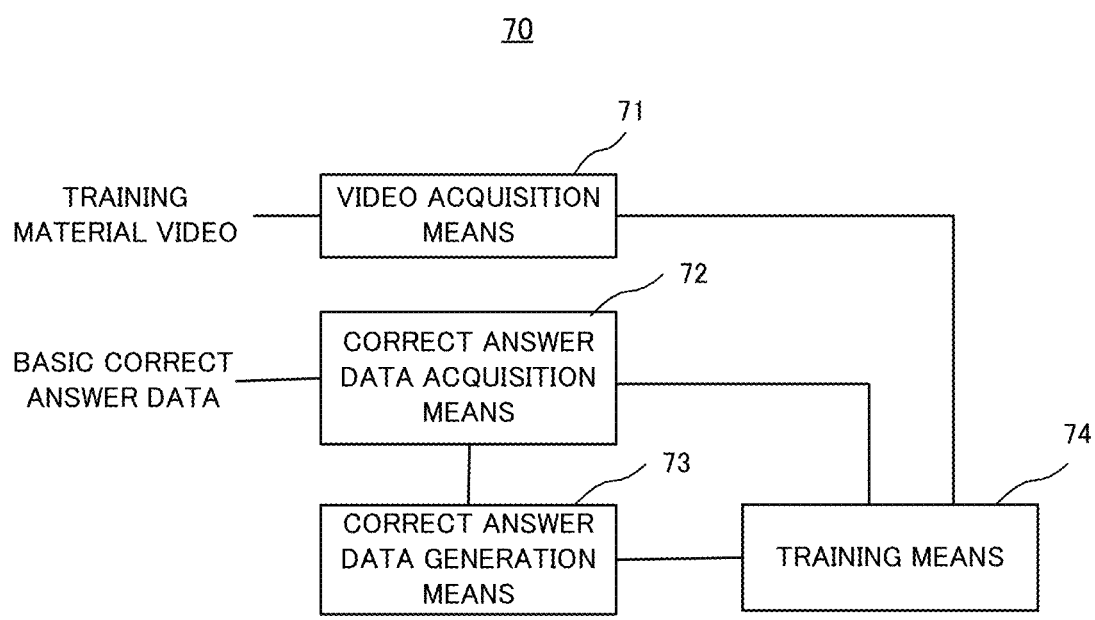

FIG. 16B is a block diagram illustrating a functional configuration of a training device according to a third example embodiment. As shown, the training device 70 includes a video acquisition means 71, a correct answer data acquisition means 72, a correct answer data generation means 73, and a training means 74. The video acquisition means 71 acquires the training material video. The correct answer data acquisition means 72 acquires the basic correct answer data in which correct answer tags are given to the important scenes in the training material video. The correct answer data generation means 73 generates additional correct answer data to be used for training of different models, from the basic correct answer data. The training means 74 performs training of the plurality of models using training material video and correct answer data.

A part or all of the example embodiments described above may also be described as the following supplementary notes, but not limited thereto.

(Supplementary Note 1)

A video processing device comprising:
 a video acquisition means configured to acquire a material video;
 an importance calculation means configured to calculate importance in the material video using a plurality of models;
 an importance integration means configured to integrate the importance calculated using the plurality of models; and
 a generation means configured to extract important scenes in the material video based on the integrated importance and generate a digest video including the extracted important scenes.

(Supplementary Note 2)

The video processing device according to Supplementary note 1,
 wherein the plurality of models include:
 a basic model which calculates the importance of the material video at a certain time based on the video at the certain time; and
 one or more shift models which calculate the importance of the material video at a certain time based on the video at a predetermined time before or after the certain time.

(Supplementary Note 3)

The video processing device according to Supplementary note 2,
 wherein the basic model is a trained model trained using basic correct answer data in which correct answer tags are given to the important scenes of the material video, and
 wherein the shift model is a trained model trained using shifted correct answer data obtained by shifting the correct answer tags in the basic correct answer forward or backward by a predetermined time.

(Supplementary Note 4)

The video processing device according to Supplementary note 3, wherein the importance integration means shifts the importance calculated by the shift model by the predetermined time in a direction opposite to a direction in which the correct answer tags are shifted in the shifted correct answer data, and adds the shifted importance to the importance calculated by the basic model.

(Supplementary Note 5)

The video processing device according to Supplementary note 1, wherein the plurality of models include models which calculate the importance of the material video in units of different time widths.

(Supplementary Note 6)

The video processing device according to Supplementary note 5, wherein the plurality of models are trained models trained using correct answer data in which correct answer tags are given to the important scenes of the material video in units of different time widths.

(Supplementary Note 7)

The video processing device according to Supplementary note 5 or 6, wherein the importance integration means adds the importance calculated by the plurality of models.

(Supplementary Note 8)

The video processing device according to any one of Supplementary notes 5 to 7, further comprising a video adjustment means configured to generate material videos of different time widths from the material video and output the generated material videos to the corresponding models.

(Supplementary Note 9)

A video processing method comprising:
 acquiring a material video;
 calculating importance in the material video using a plurality of models;
 integrating the importance calculated using the plurality of models; and
 extracting important scenes in the material video based on the integrated importance and generating a digest video including the extracted important scenes.

(Supplementary Note 10)

A recording medium recording a program, the program causing a computer to perform processing comprising:
 acquiring a material video;
 calculating importance in the material video using a plurality of models;
 integrating the importance calculated using the plurality of models; and
 extracting important scenes in the material video based on the integrated importance and generating a digest video including the extracted important scenes.

(Supplementary Note 11)

A training device comprising:
 a video acquisition means configured to acquire a training material video;
 a correct answer data acquisition means configured to acquire basic correct answer data in which correct answer tags are given to important scenes in the training material video;
 a correct answer data generation means configured to generate additional correct answer data to be used in training different models from the basic correct answer data; and
 a training means configured to perform training of a plurality of models using the training material video and the correct answer data.

(Supplementary Note 12)

The training device according to Supplementary note 11, wherein the correct answer data generation means generates the additional correct answer data by shifting the correct answer tags in the basic correct answer data forward or backward by a predetermined time.

(Supplementary Note 13)

The training device according to Supplementary note 11, wherein the correct answer data generation means generates the additional correct answer data including the correct answer tags of different time widths, based on the basic correct answer data.

(Supplementary Note 14)

A training method comprising:

acquiring a training material video;

acquiring basic correct answer data in which correct answer tags are given to important scenes in the training material video;

generating additional correct answer data to be used in training different models from the basic correct answer data; and performing training of a plurality of models using the training material video and the correct answer data.

(Supplementary Note 15)

A recording medium recording a program, the program causing a computer to perform processing comprising:

acquiring a training material video;

acquiring basic correct answer data in which correct answer tags are given to important scenes in the training material video;

generating additional correct answer data to be used in training different models from the basic correct answer data; and performing training of a plurality of models using the training material video and the correct answer data.

While the present invention has been described with reference to the example embodiments and examples, the present invention is not limited to the above example embodiments and examples. Various changes which can be understood by those skilled in the art within the scope of the present invention can be made in the configuration and details of the present invention.

DESCRIPTION OF SYMBOLS

2 Material video DB
3 Correct answer data
4 Training unit
5, 25 Digest Generation device
12 Processor
21a Basic model
21b-21n Shift model
22a-22n, 42a-42n Training unit
23, 43 Correct answer generation unit
24, 44 Importance integration unit
40 Video adjustment unit
41a-41n Generation model
100, 120, 140 Digest generation device
110, 130 Training device

What is claimed is:

1. A video processing device comprising:
a memory configured to store instructions; and
one or more processors configured to execute the instructions to:
acquire a material video;
calculate importance in the material video using a plurality of models;
integrate the importance calculated using the plurality of models; and
extract important scenes in the material video based on the integrated importance and generate a digest video including the extracted important scenes,
wherein the plurality of models include:
a first model which calculates the importance of the material video at a first time based on the material video at the first time; and
a second model which calculates the importance of the material video at a second time based on the material video at the second time, the second time being a predetermined time before or after the first time, and
wherein the processor integrates the importance by adding the importance calculated by the first model and the importance calculated by the second model.

2. The video processing device according to claim 1,
wherein the first model is a trained model trained using first correct answer data in which correct answer tags are given to the important scenes of the material video, and
wherein the second model is a trained model trained using second correct answer data obtained by shifting the correct answer tags in the first correct answer data forward or backward by a predetermined time.

3. The video processing device according to claim 2, wherein the one or more processors shift the importance calculated by the first model by the predetermined time in a direction opposite to a direction in which the correct answer tags are shifted in the second correct answer data, and add the shifted importance to the importance calculated by the first model.

4. A video processing device comprising:
a memory configured to store instructions; and
one or more processors configured to execute the instructions to:
acquire a material video;
calculate importance in the material video using a plurality of models;
integrate the importance calculated using the plurality of models; and
extract important scenes in the material video based on the integrated importance and generate a digest video including the extracted important scenes wherein the plurality of models include:
a first model which calculate the importance of the material video in units of a first time widths; and
a second model which calculates the importance of the material video in units of a second width, the second width being different from the first width, and
wherein the processor integrates the importance by adding the importance calculated by the first model and the importance calculated by the second model.

5. The video processing device according to claim 4,
wherein the first model is a trained model trained using correct answer data in which correct answer tags are given to the important scenes of the material video in units of the first time width, and
the second model is a trained model trained using correct answer data in which correct answer tags are given to the important scenes of the material video in units of the second time width.

6. The video processing device according to claim 4, wherein the one or more processors add the importance calculated by the plurality of models.

7. The video processing device according to claim 4, wherein the one or more processors are further configured to generate material videos of different time widths from the material video and output the generated material videos to the corresponding models.

8. A video processing method comprising:
acquiring a material video;
calculating importance in the material video using a plurality of models;
integrating the importance calculated using the plurality of models; and extracting important scenes in the material video based on the integrated importance and generating a digest video including the extracted important scenes, wherein the plurality of models include:

a first model which calculates the importance of the material video at a first time based on the material video at the first time; and a second model which calculates the importance of the material video at a second time based on the material video at the second time, the second time being a predetermined time before or after the first time, and wherein the importance is integrated by adding the importance calculated by the first model and the importance calculated by the second model.

9. A non-transitory computer-readable recording medium recording a program, the program causing a computer to perform the video processing method according to claim 8.

* * * * *